(12) United States Patent
Nara et al.

(10) Patent No.: US 7,763,369 B2
(45) Date of Patent: Jul. 27, 2010

(54) RESIN COMPOSITION FOR FUEL CELL MEMBER

(75) Inventors: Toshihide Nara, Ichihara (JP); Yukihiro Tsuchiya, Ichihara (JP); Hidenori Ichikawa, Hamamatsu (JP); Hiroyuki Muramatsu, Hamamatsu (JP); Yutaka Atsumi, Hamamatsu (JP)

(73) Assignee: Prime Polymer Co., Ltd., Tokyo (JP)

( * ) Notice: Subject to any disclaimer, the term of this patent is extended or adjusted under 35 U.S.C. 154(b) by 101 days.

(21) Appl. No.: 12/263,551

(22) Filed: Nov. 3, 2008

(65) Prior Publication Data

US 2009/0075126 A1  Mar. 19, 2009

Related U.S. Application Data

(63) Continuation of application No. 10/568,527, filed as application No. PCT/JP2004/011825 on Aug. 18, 2004, now abandoned.

(30) Foreign Application Priority Data

Aug. 19, 2003  (JP) .............................. 2003-295508

(51) Int. Cl.
*H01M 2/00* (2006.01)
(52) U.S. Cl. .......................... 429/12; 252/500; 252/511; 524/451; 429/34
(58) Field of Classification Search .................. 429/12, 429/34; 252/500, 511; 524/451
See application file for complete search history.

(56) References Cited

U.S. PATENT DOCUMENTS 7,611,643 B2 * 11/2009 Arai et al. ................... 252/500

2004/0048967 A1  3/2004 Tomomatsu et al.

FOREIGN PATENT DOCUMENTS

| JP | 06-287364 A | 10/1994 |
| JP | 6287364 | 10/1994 |
| JP | 07-135007 A | 5/1995 |
| JP | 7135007 | 5/1995 |
| JP | 2000-195526 A | 7/2000 |
| JP | 2001-035519 A | 2/2001 |
| JP | 2002-060560 A | 2/2002 |
| JP | 200260560 | 2/2002 |
| JP | 2000-95526 | 7/2002 |
| JP | 2003-123804 A | 4/2003 |
| WO | WO 02/20233 | 3/2002 |
| WO | WO 0220233 | 3/2002 |

OTHER PUBLICATIONS

International Search Report for International Application No. PCT/JP2004/011825 dated Nov. 30, 2004.
Patent Abstracts of Japan; Cooling Method of Fuel Cell; Application No. 2001-318159 Oct. 16, 2001; Honda Motor Co Ltd.
Patent Abstracts of Japan; Cooling Water Circulating Device for Fuel Cell; Application No. 11-201627; Jul. 15, 1999; Japan Organo Co Ltd.

* cited by examiner

*Primary Examiner*—Peter D Mulcahy
(74) *Attorney, Agent, or Firm*—Millen, White, Zelano, Branigan, P.C.

(57) ABSTRACT

There is provided a resin composition for a fuel cell member which givens only a small amount of eluting ions. A resin composition for a fuel cell member is formed to include 60 to 85 wt % of the following polypropylene and 40 to 15 wt % of the following talc:

(1) polypropylene that is homopolypropylene, block-polypropylene or a blend of homopolypropylene and blockpolypropylene, and has a melt flow rate of 2 to 40 g/10 min.;
(2) talc that has a whiteness degree of 96% or more, and an average particle diameter of 4 to 10 μm.

22 Claims, 1 Drawing Sheet

RESIN COMPOSITION FOR FUEL CELL MEMBER

This application is a continuation of Ser. No. 10/568,527 filed Sep. 25, 2006 now abandoned, which is a 371 of PCT/JP2004/011825, Aug. 18, 2004.

TECHNICAL FIELD

The invention relates to a resin composition for a fuel cell composition.

BACKGROUND ART

Hitherto, SUS 316, which is generally said to exhibit the lowest ion elution among metal materials, has been used as material used in fuel cells or conventional secondary cell systems in order to keep the cooling efficiency thereof or prevent pipes from being blocked or corroded. However, the use of resin has been desired from the viewpoint of molding workability or a height of the flexibility of shapeability. The use of resin material such as polypropylene or polyvinylidene fluoride has been investigated.

For example, in the case of fuel cells for automobiles, the desire has been met by using material exhibiting a very low ion elution (such as SUS 316) as material of heat exchangers or pipes for circulating cooling liquid. In such a case, however, the shape of the heat exchangers or the fabricating method thereof is restricted. Thus, an increase in the size of the thermal exchangers, an increase in the weight thereof, an increase in costs, and others are caused. When metal material is used, metal ions may elute out gradually from the material itself or corrosion may advance from slight scratches in the surface thereof. There is a method for coping therewith by subjecting the inside of a heat exchanger to coating so as to decrease ion elution. However, if the coating deteriorates, ions may elute out (see, for example, Japanese Patent Application Laid-Open (JP-A) No. 2001-035519, and JP-A No. 2003-123804).

Accordingly, it has been desired to develop resin material as a substitute therefor. However, when the resin material is used in the form of a simple substance, products therefrom warp or deform. Dependently on the use environment thereof, the resin material is insufficient in heat resistance and rigidity. In order to compensate for these, an attempt of incorporating a filler such as talc, mica, glass fiber or calcium carbonate has been made.

Incidentally, these fillers are each inorganic powder obtained by pulverizing a mineral, and thus metal ions elute easily therefrom. In the case of, for example, talc, main components thereof are silicon dioxide and magnesium oxide. Besides, aluminum oxide, iron oxide, calcium oxide and so on are contained therein. As eluting cations, silicon, magnesium, aluminum, iron, calcium and other ions are detected. Besides, sodium, potassium and zinc ions are detected as impurity cations, and chloride ions, hydroxide ions and other ions are detected as anions. Accordingly, about composite compositions into which a filler is incorporated, metal ions elute out very much. Thus, the stability of physical properties thereof over a long term is also poor. As a result, there is a problem that the composition cannot be used.

Accordingly, an object of the invention is to provide a resin composition for a fuel cell member which gives only a small amount of eluting ions.

DISCLOSURE OF THE INVENTION

The inventors have paid attention to a combination of polypropylene excellent in molding workability and talc, which is an inexpensive filler having a high reinforcing effect, and have eagerly investigated so as to find out that talc having specific properties (whiteness, particle diameter, and specific surface area) and the blend amount of the talc are adjusted, thereby yielding a material from which metal ions are restrained from eluting out, the material being stable in long-term physical properties.

According to the invention, provided is the following resin composition for a fuel cell member:

1. A resin composition for a fuel cell member including 60 to 85 wt % of the following polypropylene and 40 to 15 wt % of the following talc:

(1) polypropylene that is homopolypropylene, block-polypropylene or a blend of homopolypropylene and block-polypropylene, and has a melt flow rate of 2 to 40 g/10 min.;

(2) talc that has a whiteness degree of 96% or more, and an average particle diameter of 4 to 10 μm.

2. The resin composition for a fuel cell member according to item 1, wherein the specific surface area of the talc is from 7 to 45 $m^2/g$.

3. The resin composition for a fuel cell member according to item 1 or 2, wherein when the total weight of the polypropylene and the talc is regarded as 100 parts by weight, 0.01 to 1 part by weight of carbon black is contained.

4. The resin composition for a fuel cell member according to any one of items 1 to 3, wherein the electric conductivity is 2 μS/cm or less.

5. The resin composition for a fuel cell member according to any one of items 1 to 4, wherein the fuel cell member is a fuel cell cooling circuit member, a fuel cell ion exchanging member, or a fuel cell ion exchanging cartridge.

According to the invention, it is possible to provide a resin composition for a fuel cell member which gives only a small amount of eluting ions.

BEST MODE FOR CARRYING OUT THE INVENTION

Figure 1:
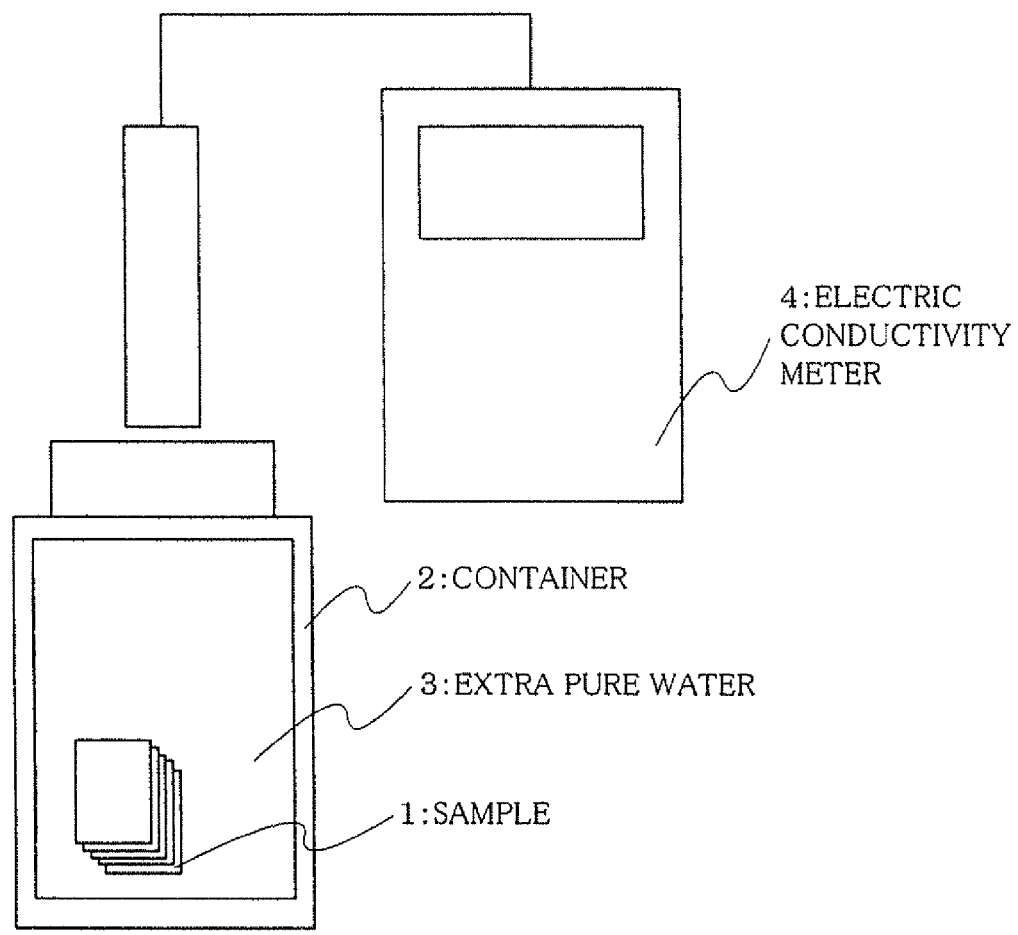
FIG. 1 is a view illustrating a device used to measure electric conductivities in Examples and Comparative Examples.

The invention will be described herein after.

The polypropylene used in the resin composition of the F invention may be homopolypropylene, blockpolypropylene or a blend of homopolypropylene and blockpolypropylene.

Examples of the comonomer of the blockpolypropylene include ethylene and butene-1. Ethylene is particularly preferred.

The melt flow rate (MFR) of this polypropylene is from 2 to 40 g/10 min, preferably from 6 to 30 g/10 min, more preferably from 6 to 15 g/10 min. The MFR is measured in accordance with JIS K 7210-1999 under the following conditions: a resin temperature of 230° C., and a load of 21.18 N (2.16 kgf).

If the MFR is less than 2 g/10 min, the moldability may deteriorate. If the MFR is more than 40 g/10 min., the strength may be poor.

In order to set the MFR into the above-mentioned range, for example, it is advisable to adjust the molecular weight by the adjustment of the concentration of hydrogen at the time of polymerizing the polypropylene or some other operation, or decompose it with peroxide.

The talc used in the resin composition of the invention has a whiteness of 96% or more. The whiteness is measured in accordance with JIS P 8123. The whiteness is preferably 97% or more, more preferably 98% or more.

If the whiteness is less than 96%, the amount of eluting ions may be large so that the resin composition cannot be used as a composition for a fuel cell member. Additionally, the physical stability over a long term may deteriorate.

In order to set the whiteness into the above-mentioned range, for example, the producing district is selected or the talc is pulverized, is washed to remove impurities or is subjected to surface treatment.

The average particle diameter of the talc is from 4 to 10 μm, preferably from 4.5 to 8 μm, more preferably from 5 to 8 μm. The average particle diameter can be measured by laser analysis method.

If the average particle diameter is more than 10 μm, the elution-out of metal ions may increase. If it is less than 4 μm, there may be the following possibility; The particle diameter is fine and thus the dispersion of the talc into the polypropylene deteriorates or the talc goes up as dust into the air at the time of the production so that the handling ability may deteriorate.

In order to set the average particle diameter into the above-mentioned range, for example, the talc is pulverized, is powdered into fine particles by high-speed stirring, or is subjected to classification for collecting specific particle diameters.

The specific surface area of the talc is from 7 to 45 $m^2/g$, preferably from 7 to 40 $m^2/g$, more preferably from 30 to 40 $m^2/g$. The specific surface area can be measured by the BET method.

If the specific surface area is less than 7 $m^2/g$, the elution-out of metal ions may increase. If it is more than 45 $m^2/g$, there may be the following possibility; The dispersion of the talc into the polypropylene deteriorates or the talc goes up as dust into the air at the time of the production so that the handling ability may deteriorate.

In order to set the specific surface area into the above-mentioned range, for example, the talc is powdered into fine particles by high-speed stirring, or is treated with a treating agent for preventing re-aggregation.

In the resin composition of the invention, about the composition ratio between the polypropylene and the talc, the polypropylene:talc is 60-85 wt %:40-15 wt %, preferably 68-78 wt %:32-22 wt %, more preferably 70-80 wt %:30-25 wt %.

If the amount of the talc is less than 15 wt %, the resin composition may cave or warp when it is molded so that the rigidity deteriorate. If it is more than 40 wt %, the amount of eluting ions may be large and thus the composition may not be used as a composition for a fuel cell member.

In order to color the resin composition of the invention into black, the composition may contain carbon black. When the total amount of the polypropylene and the talc is regarded as 100 parts by weight, the carbon black is preferably added thereto in an amount of 0.01 to 1 part by weight.

The resin composition of the invention may contain other additives as long as the properties thereof are not damaged. If necessary, various additives may be added, examples of which include reforming additives such as a dispersing agent, a lubricant (such as magnesium stearate), a plasticizer, a flame retardant, an antioxidant (such as a phenol based antioxidant, a phosphorus-containing antioxidant or a sulfur-containing antioxidant), an antistatic agent, a light stabilizer, an ultra violet absorber, a crystallization promoter (a nucleus-forming agent), a foaming agent, a crosslinking agent, and an antibacterial agent; pigments, dyes and other coloring agents (such as titanium oxide, colcothar, azo pigments, anthraquinone pigments, and phthalocyanine); particulate fillers such as calcium carbonate, mica, and clay; fillers in a short fiber form, such as wollastonite; and other additives such as whiskers such as potassium titanate. These additives may be added when the composition is produced, or the additives may be made into a master batch (M/B) and added when the composition is produced.

The resin composition of the invention may be produced by charging the above-mentioned components directly into an extruder. The composition may be produced by kneading and dispersing all of the components with a Mixing roll, a Banbury mixer, a kneader or the like and then charging the resultant into an extruder. The components may be dry-blended with a tumbler type blender, a Henschel mixer, or a ribbon mixer. The composition can also be produced by preparing an M/B of the above-mentioned components in advance and incorporating the M/B by the above-mentioned method. The method of preparing the M/B is preferred.

The resin composition of the invention can be preferably used for a fuel cell member since the amount of eluting ions is small.

The electric conductivity of the resin composition of the invention is preferably 2 μS/cm or less, more preferably from 2 to 0.5 μS/cm. The electric conductivity can be measured by use of extra pure water.

When the electric conductivity is 2 μS/cm or less, the amount of eluting ions is small and thus the composition can be more preferably used as a composition for a fuel cell member.

When the resin composition of the invention is molded, a known forming method can be used without any restriction. Examples thereof include injection molding, extrusion molding, blow molding, compression molding, injection compression molding, gas-insufflating injection molding, and foaming injection molding. Injection molding, compression molding, and injection compression molding are particularly preferred.

Examples of the fuel cell member fabricated from the resin composition of the invention include fuel cell members for automobiles or household articles and peripheral members thereof. The fuel cell member is, for example, a fuel cell cooling circuit member, a fuel cell ion exchanging member, a fuel cell ion exchanging cartridge, or the like.

EXAMPLES

Example 1

The following components were blended and the blend was injection-molded into a molded product:

(a) polypropylene (PP) (J-784HV manufactured by Idemitsu Petrochemical Co., Ltd., block PP, MFR=12 g/10 minutes): 75 wt %, (b) talc (TP-A25 manufactured by Fuji Talc Industrial Co., Ltd., whiteness: 98%, average particle diameter: 4.96 μm, specific surface area: 40 m²/g, and residue on a 45 μm sieve: 0.002%): 25 wt %, (c) antioxidant (Adekastab A0-20 manufactured by Asahi Denka Co., Ltd): 0.2 part by weight,
  antioxidant (Yoshitomi DMTP, manufactured by Yoshitomi Fine Chemical Co., Ltd.): 0.2 part by weight, (d) magnesium stearate (AFCO CHEM MGS-1, manufactured by Asahi Denka Co., Ltd): 0.2 part by weight, and (e) carbon black M/B (50 wt % polypropylene M/B of Vulcan 9 manufactured by Cabot Corporation.): 0.5 part by weight.

The amounts of the (c) to the (e) are represented by values of parts by weight when the total amount of the block PP and the talc are regarded as 100 parts by weight.

Physical properties of this molded product were measured by the following methods. The results are shown in Table 1.

(1) Measurement of the Electric Conductivity

A device illustrated in FIG. 1 was used to measure the electric conductivity by the following steps:

1. Seven samples 1 (64 mm×12.7 mm×3.2 mm) (one set) of each of Examples and Comparative Examples were prepared.

2. A 500-mL container 2 made of PFA (made of fluorine-contained resin) was prepared.

3. The container 2 was subjected to overflow-washing with pure water.

4. The container 2 was subjected to shake-washing with pure water.

5. The container 2 was subjected to shake-washing with extra pure water.

6. The container 2 was dried.

7. The container 2 was subjected to shake-washing with extra pure water.

8. Each of the samples 1 was subjected to cup-washing with extra pure water.

9. The sample 1 was transferred to the container 2.

10. The container 2 and the sample 1 were together washed with extra pure water.

11. Extra pure water 3 was put thereinto up to an UP level line.

12. The sample was stirred at 80° C. for 24 hours.

13. After a lapse of 10 hours, the container 2 was taken out from the thermostat bath and then cooled to ambient temperature.

14. An electric conductivity meter 4 was checked.

Whenever the sample sets of each of Examples and Comparative Examples were changed, the value of a blank wherein no sample was put was also measured.

(2) Bending Strength
  It was measured according to ASTM D790 (at 23° C.).
  Sample piece: 127 mm×12.7 mm×3.2 mm (3) Flexural Modulus
  It was measured according to ASTM D790 (at 23° C.).
  Sample piece: 127 mm×12.7 mm×3.2 mm (4) Izod Impact Strength
  It was measured according to ASTM D256 (at 23° C.).
  Sample piece: 64 mm×12.7 mm×3.2 mm, with a notch (5) Thermal Aging Resistance
  After the sample was kept at 150° C. for 1200 hours, the stretch retention rate thereof was measured. The tensile strength was measured according to ASTM D638.
  Sample piece: ASTM type I, dumbbell thickness: 3.2 mm

TABLE 1

| | | Physical properties of talc | | | Blended amounts in the composition | | | | | Physical properties of the composition | | | | |
|---|---|---|---|---|---|---|---|---|---|---|---|---|---|---|
| | Kind of pp | Whiteness (%) | Average particle diameter (μm) | Specific surface area (m²/g) | PP (wt %) | Talc (wt %) | Antioxidant (pbw*) | Mg stearate (pbw) | Carbon black M/B (pbw) | Electric conductivity (μS/cm) | Bending Strength (MPa) | Flexural modulus (MPa) | Izod impact strength (J/m) | Thermal aging resistance (%) |
| Ex. 1 | Block PP | 98 | 4.96 | 40 | 75 | 25 | 0.4 | 0.2 | 0.5 | 1.1 | 3300 | 45 | 53 | 90 |
| Ex. 2 | Block PP | 98 | 4.96 | 40 | 70 | 30 | 0.4 | 0.2 | 0 | 1.5 | 3000 | 48 | 48 | 90 |
| Ex. 3 | Block PP | 97 | 5.83 | 30 | 75 | 25 | 0.4 | 0.2 | 0.5 | 1.8 | 3000 | 44 | 47 | 90 |
| Comp. Ex. 1 | Block PP | 98 | 4.96 | 40 | 90 | 10 | 0.4 | 0.2 | 0.5 | 1.2 | 2000 | 22 | 60 | 90 |
| Comp. Ex. 2 | Block PP | 98 | 4.96 | 40 | 55 | 45 | 0.4 | 0.2 | 0.5 | 2.2 | 4300 | 55 | 40 | 85 |
| Comp. Ex. 3 | Block PP | 91 | 20.6 | 6 | 75 | 25 | 0.4 | 0.2 | 0.5 | 2.4 | 3100 | 44 | 50 | 75 |

*pbw: part by weight

Example 2

Production and measurement were performed in the same way as in Example 1 except that the amount of the polypropylene was changed from 75 wt % to 70 wt %, that of the talc was changed from 25 wt % to 30 wt % and that of the carbon black M/B was changed from 0.5 part to 0 part in Example 1.

Example 3

Production and measurement were performed in the same way as in Example 1 except that the talc in Example 1 (TP-A25 manufactured by Fuji Talc Industrial Co., Ltd., whiteness: 98%, average particle diameter: 4.96 μm, specific surface area: 40 m²/g, and residue on a 45 μm sieve: 0.002%) was changed to talc (LMK-100 manufactured by Fuji Talc Industrial Co., Ltd., whiteness: 97%, average particle diameter: 5.83 μm, specific surface area: 30 m$^2$/g, and residue on a 45 μm sieve: 0.003%).

Comparative Example 1

Production and measurement were performed in the same way as in Example 1 except that the amount of the polypropylene in Example 1 was changed from 75 wt % to 90 wt % and that of the talc was changed from 25 wt % to 10 wt %.

Comparative Example 2

Production and measurement were performed in the same way as in Example 1 except that the amount of the polypropylene in Example 1 was changed from 75 wt % to 55 wt % and that of the talc was changed from 25 wt % to 45 wt %.

Comparative Example 3

Production and measurement were performed in the same way as in Example 1 except that the talc in Example 1 (TP-A25 manufactured by Fuji Talc Industrial Co., Ltd., whiteness: 98%, average particle diameter: 4.96 μm, specific surface area: 40 m$^2$/g, and residue on a 45 μm sieve: 0.002%) was changed to talc manufactured by Asada Milling Co., Ltd., whiteness: 91%, average particle diameter: 20.6 μm, specific surface area: 6 m$^2$/g, and residue on a 45 μm sieve: 0.24%).

As is shown in Table 1, the electric conductivity of the resin compositions of Examples was 2.0 μS/cm or less. The retention rate of the tensile strength thereof was 90% or more according to the long-term thermal resistance test. Thus, the physical properties thereof were maintained over a long term.

INDUSTRIAL APPLICABILITY

The resin composition for a fuel cell member of the invention can be used for a fuel cell member.

The invention claimed is:

1. A method for preparing a fuel cell member comprising: molding said member from a resin composition to form a fuel cell member, said resin composition comprising polypropylene and talc, wherein:
   (1) the amount of said polypropylene is 60 to 85 wt %, based on the total weight of polypropylene and talc, wherein said polypropylene is homopolypropylene, blockpolypropylene or a blend of homopolypropylene and blockpolypropylene, and said polypropylene has a melt flow rate of 2 to 40 g/10 min; and
   (2) the amount of said talc is 40 to 15 wt % based on the total weight of polypropylene and talc, wherein said talc has a whiteness degree of 96% or more, and an average particle diameter of 4 to 10 μm.

2. A method according to claim 1, wherein the specific surface area of the talc is from 7 to 45 m$^2$/g.

3. A method according to claim 1, wherein said composition further comprises 0.01 to 1 part by weight of carbon black, based on 100 parts by weight for the total weight of the polypropylene and the talc.

4. A method according to claim 1, wherein said composition has an electric conductivity of 2 μS/cm or less.

5. A method according to claim 1, wherein said fuel cell member is a fuel cell cooling circuit member, a fuel cell ion exchanging component, or a fuel cell ion exchanging cartridge.

6. A method for preparing a fuel cell member comprising: molding said member from a resin composition to form a fuel cell member, said resin composition comprising polypropylene and talc, wherein:
   (1) the amount of said polypropylene is 60 to 85 wt %, based on the total weight of polypropylene and talc, wherein said polypropylene is homopolypropylene, blockpolypropylene or a blend of homopolypropylene and blockpolypropylene, and said polypropylene has a melt flow rate of 2 to 40 g/10 min;
   (2) the amount of said talc is 40 to 15 wt %, based on the total weight of polypropylene and talc, wherein said talc has a whiteness degree of 96% or more, and an average particle diameter of 4 to 10 μm;
   wherein said composition further comprises 0.01 to 1 part by weight of carbon black, based on 100 parts by weight for the total weight of the polypropylene and the talc, and said composition has an electric conductivity of 2 μS/cm or less.

7. In a fuel cell, the improvement wherein at least a portion of said fuel cell is made by the method according to claim 1.

8. A fuel cell according to claim 7, wherein said resin composition further comprises 0.01 to 1 part by weight of carbon black, based on 100 parts by weight for the total weight of the polypropylene and the talc, and said resin composition has an electric conductivity of 2 μS/cm or less.

9. A fuel cell according to claim 7, wherein said resin composition further comprises 0.01 to 1 part by weight of carbon black, based on 100 parts by weight for the total weight of the polypropylene and the talc.

10. A fuel cell according to claim 7, wherein said composition has an electric conductivity of 2 μS/cm or less.

11. A fuel cell according to claim 7, wherein said portion of said fuel cell that is made from said resin composition is a fuel cell cooling circuit member, a fuel cell ion exchanging component, a fuel cell ion exchanging cartridge, or a combination thereof.

12. The method according to claim 1, wherein the melt flow rate of the polypropylene is from 6 to 30 g/10 min.

13. The method according to claim 1, wherein the melt flow rate of the polypropylene is from 6 to 15 g/10 min.

14. The method according to claim 1, wherein, and the average particle diameter of the talc is from 4.5 to 8 μm.

15. The method according to claim 1, wherein, and the average particle diameter of the talc is from 5 to 8 μm.

16. The method according to claim 1, wherein the specific surface area of the talc is from 7 to 40 m$^2$/g.

17. The method according to claim 1, wherein the specific surface area of the talc is from 30 to 40 m$^2$/g.

18. The method according to claim 1, wherein the composition ratio of polypropylene to talc is 60-85 wt %:40-15 wt %.

19. The method according to claim 1, wherein the composition ratio of polypropylene to talc is 68-78 wt %:32-22 wt %.

20. The method according to claim 1, wherein the composition ratio of polypropylene to talc is 70-80 wt %:30-25 wt %.

21. The method according to claim 1, wherein said composition has an electric conductivity of 2 to 0.5 μS/cm.

22. A method of reducing the amount of ions eluting from the materials used to make a fuel cell, said method comprising manufacturing at least a portion of the fuel cell by a method according to claim 1.

* * * * *